United States Patent [19]

Takakado

[11] Patent Number: 5,065,086
[45] Date of Patent: Nov. 12, 1991

[54] ENGINE DRIVEN GENERATOR
[75] Inventor: Yuzo Takakado, Aichi, Japan
[73] Assignee: Shinko Electric Co., Ltd., Tokyo, Japan
[21] Appl. No.: 339,990
[22] Filed: Apr. 18, 1989
[30] Foreign Application Priority Data Apr. 19, 1988 [JP] Japan .................................. 63-94553

[51] Int. Cl.$^5$ ...................... F02N 11/04; B60L 11/06
[52] U.S. Cl. ......................... 322/10; 322/29; 322/32; 290/46
[58] Field of Search ................ 322/10, 11, 29, 32; 290/46 R

[56] References Cited

U.S. PATENT DOCUMENTS

| | | | |
|---|---|---|---|
| 4,119,861 | 10/1978 | Gocho | 322/32 X |
| 4,330,743 | 5/1982 | Glennon | 322/10 |
| 4,786,852 | 11/1988 | Cook | 322/10 |
| 4,841,216 | 6/1989 | Okada et al. | 322/29 X |

Primary Examiner—R. J. Hickey
Attorney, Agent, or Firm—Flynn, Thiel, Boutell & Tanis

[57] ABSTRACT

An engine driven generator having an engine, a three-phase synchronous generator to be driven by the engine, a direct current power supply for actuating the engine, a direct current/alternating current power supply converter for converting a direct current power of the direct current power supply to an alternating current power and supplying the alternating current power to the three-phase synchronous generator:

(1) characterized in further comprising a full-wave rectifier for rectifying an output of the three-phase generator and supplying the thus rectified output to the direct current/alternating current power converter; a switching unit for switching output terminals of the direct current/alternating current power converter to terminals of an outer device or output terminals of the synchronous generator; a rotor position detector for detecting a position of a rotor of the synchronous generator; and (2) characterized in that during the period when the three-phase synchronous generator performs the power generating operation after completing the actuation of the engine, a pair of positive and negative first single-phase switching elements are subjected to successive ON/OFF control operation while one pair of two-phase switching elements and the other pair of two-phase switching elements are alternated for each half of the time and subjected to PWM control operation so that output terminals corresponding to the two-phase switching elements are short-circuited with each other.

9 Claims, 14 Drawing Sheets

ENGINE DRIVEN GENERATOR

FIELD OF THE INVENTION

The present invention relates to an engine driven generator having a synchronous generator to be used as an engine starter when the engine is actuated.

BACKGROUND OF THE INVENTION

Figure 16A:
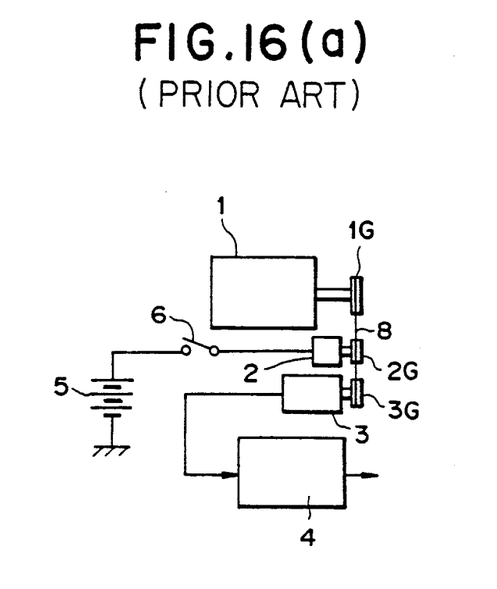
Figure 16B:
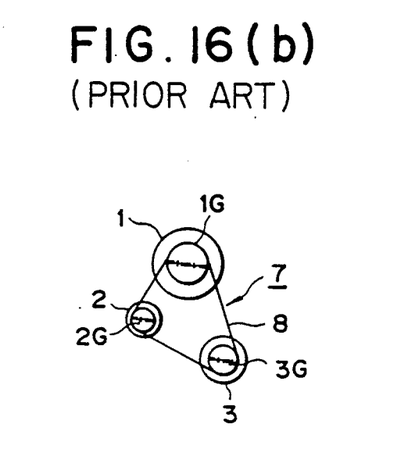

A prior art generator of this type having more than middle capacity (private generator) will be described with reference to FIGS. 16(a) and 16(b).

The generator comprises an engine 1, a starter (actuation generator) 2, a generator (three-phase synchronous generator) 3, a power converter 4, a starter power supply (battery) 5, an actuation switch 6, a transmission unit 7 composed of a pulley 1G attached to a shaft of the engine 1, a pulley 2G attached to a shaft of the starter 2, a pulley 3G attached to a shaft of the generator 3, and a belt 8 entrained around the pulleys 1G, 2G, and 3G.

Actuation or starting of the generator is carried out in the manner that firstly the switch 6 is turned on for supplying a power from the power supply 5 to drive the starter 2. Secondly, a turning effect of the starter 2 is transmitted to the engine 1 via the transmission unit 7 for thereby starting the engine 1 which results in simultaneously starting the generator 3. Thirdly, the speed of rotation N of the generator 3 is increased to reach a speed of rotation $N_o$ where a predetermined value of alternating voltage can be issued from the power converter 4, whereby the actuation is completed. Fourthly, an alternating current power having a predetermined voltage with a predetermined frequency can be supplied to a load (not shown). The power converter 4 comprises a main circuit having switching elements composed of a plurality of transistors formed in bridge connection and a control circuit having a drive unit for supplying an ON-OFF signal to the main circuit for effecting inverting operation. The power generated by the generator 3 is stably converted to an alternating current power having a predetermined voltage value and predetermined frequency. After the starting operation of the engine 1 has been completed, the switch 6 is released.

Inasmuch as the prior art generator, as described above, requires the starter to be used exclusively for starting or actuating the engine, there causes such a problem that the generator unit is large and complex. At the same time, there is a problem of deterioration of reliability and maintenance of the generator unit caused by the trouble of the starter.

SUMMARY OF THE INVENTION

It is a first object of the present invention to provide an engine driven generator having no exclusive starter.

It is a second object of the present invention to provide an engine driven generator having a simple and compact control structure with easy maintenance.

It is a third object of the present invention to provide an engine driven generator having a control system capable of employing a three-phase generator as a highly economical single-phase generator.

To achieve the above objects, the engine driven generator includes an engine, a three-phase synchronous generator to be driven by the engine, a direct current power supply for actuating the engine, and a direct current/alternating current power supply converter for converting a direct current power of the direct current power supply to an alternating current power and supplying the alternating current power to the three-phase synchronous generator. The invention further comprises a full-wave rectifier for rectifying an output of the three-phase generator and supplying the thus rectified output to the direct current/alternating current power converter; a switching unit for switching output terminals of the direct current/alternating current power converter to terminals of an outer device or to output terminals of the synchronous generator; and a rotor position detector for detecting a position of a rotor of the synchronous generator. During the period when the three-phase synchronous generator performs the power generating operation after completing the actuation of the engine, a pair of positive and negative first single-phase switching elements are subjected to successive ON/OFF control operation while two pairs of two-phase switching elements are operated alternately for half of the time each, and are subjected to PWM control operation while output terminals corresponding to the pairs of two-phase switching elements are short-circuited with each other.

The above and other objects, features and advantages of the present invention will become more apparent from the following description taken in conjunction with the accompanying drawings.

BRIEF DESCRIPTION OF THE DRAWINGS

FIG. 16(a) is a block diagram of a prior art generator; and back (hereafter referred to as backflow prevention diode), and an actuation manual switch 17 connected to the direct current power supply 15 at one end and to a control circuit 19 (described later) at the other end. The control circuit 19 controls the main circuit of the inverter 13, and receives output voltages U, V and W from this main circuit along with an output voltage from the direct current power supply 15, as well as receiving a detection signal α (αu, αv, αw) for carrying out a function described later.

Figure 1:
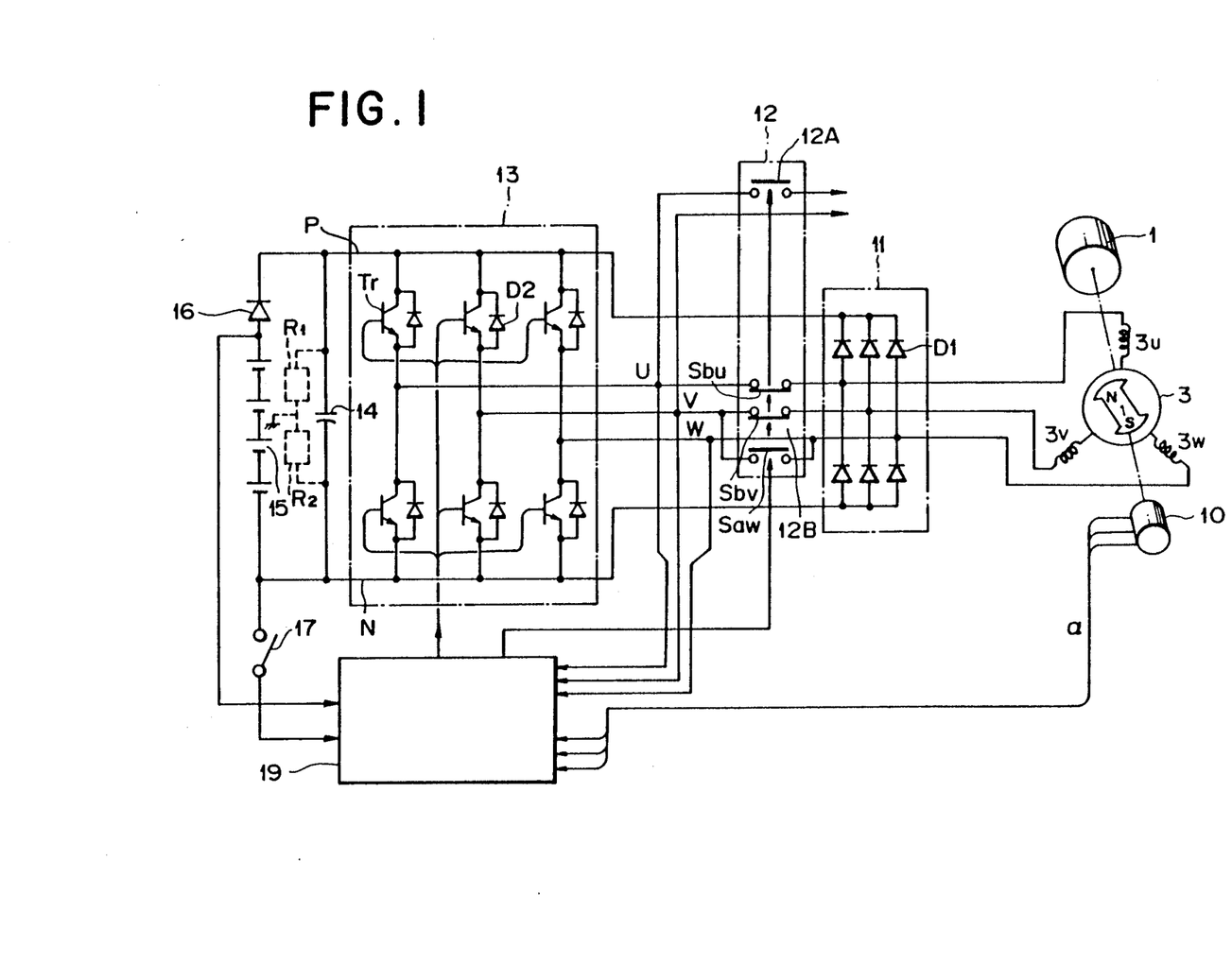
FIG. 1 is a circuit diagram of an engine driven generator according to a first embodiment of the present invention.

The rotor position detector 10 can be replaced by a detector of fixed type operation capable of obviating a shaft connection with the generator 3 for integrating the output voltage of the generator 3 to detect the magnetic pole position.

The switch 12A connects or disconnects the output terminals u and v of the main circuit of the inverter 13 to or from terminals of loads (not shown) while the contacts Saw connect or disconnect the output terminal v to or from the output terminal w, and the contacts Sbu and Sbv connect or disconnect the respective output terminals u and v to or from corresponding input terminals of the full-wave rectifier 11. The output terminal w and the corresponding input terminal of the full-wave rectifier 11 are directly connected with each other.

Figure 13:
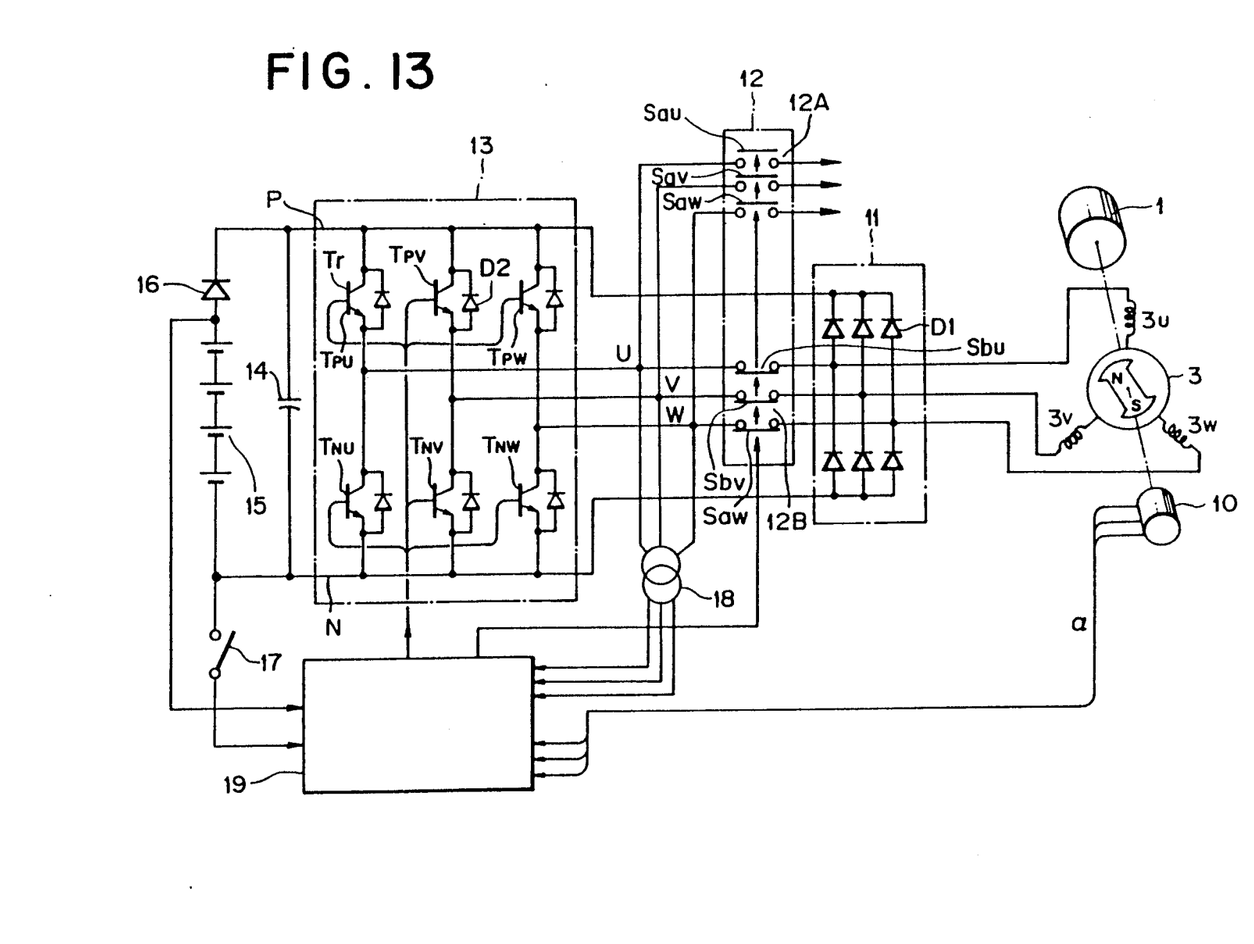
FIG. 13 is a circuit diagram of an engine driven generator according to a fifth embodiment of the present invention.

The six switching elements Tr of the main circuit of the inverter 13 have for example, U-phase transistors $T_{PU}$, $T_{NU}$, V-phase transistor $T_{PV}$, $T_{NV}$, and W-phase transistors $T_{PW}$, $T_{NW}$ (see, e.g., FIG. 13). The output terminals u and v of the main circuit of the inverter 13 are connected with terminals of the load via the switch 12A of the switching unit 12 while being connected to the full-wave rectifier 11 via the switch 12B of the switching unit 12.

Figure 2:
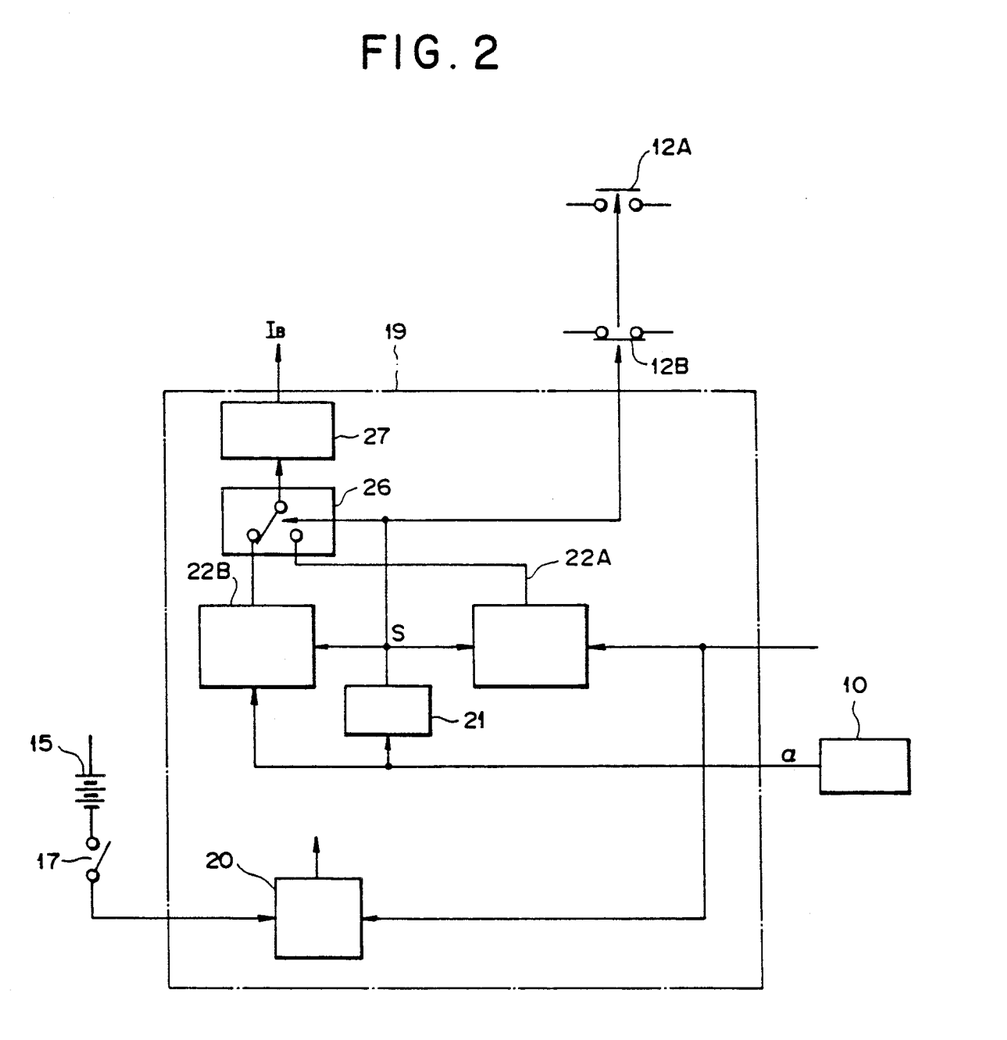
FIG. 2 is a control circuit in the circuit diagram of FIG. 1.
Figure 3:
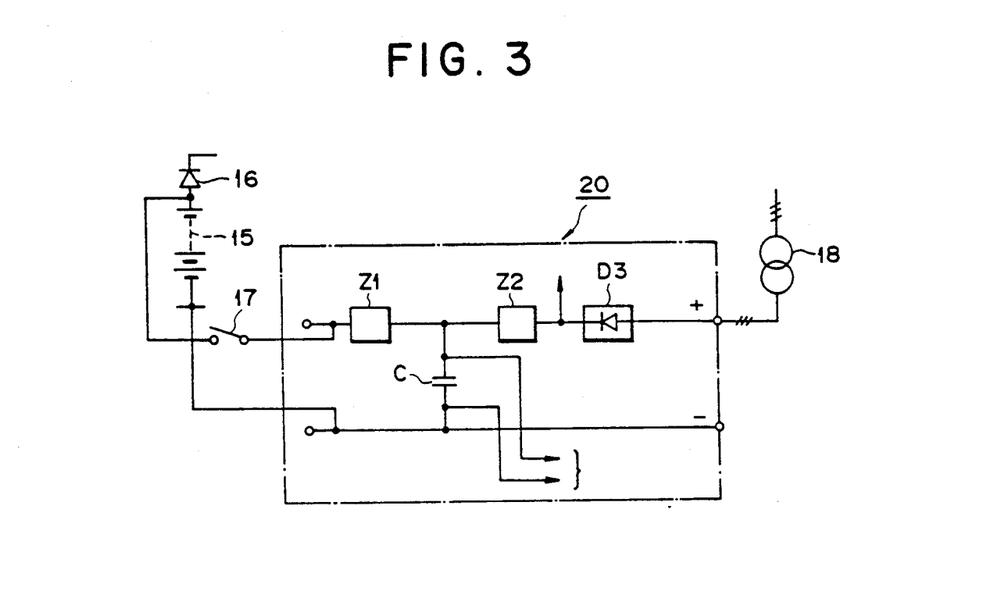
FIG. 3 is a control power supply in the control circuit of FIG. 2.
Figure 4:
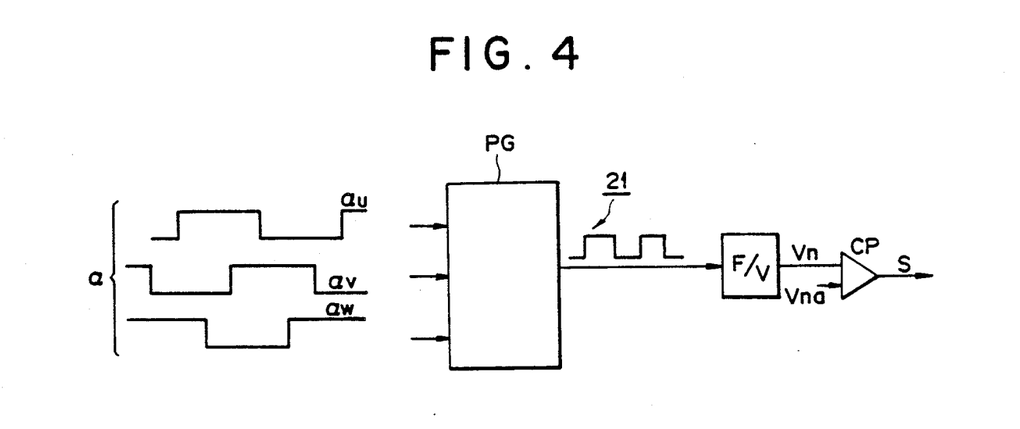
FIG. 4 is a circuit diagram illustrating an actuation completion detector in the control circuit of FIG. 2.
Figure 5:
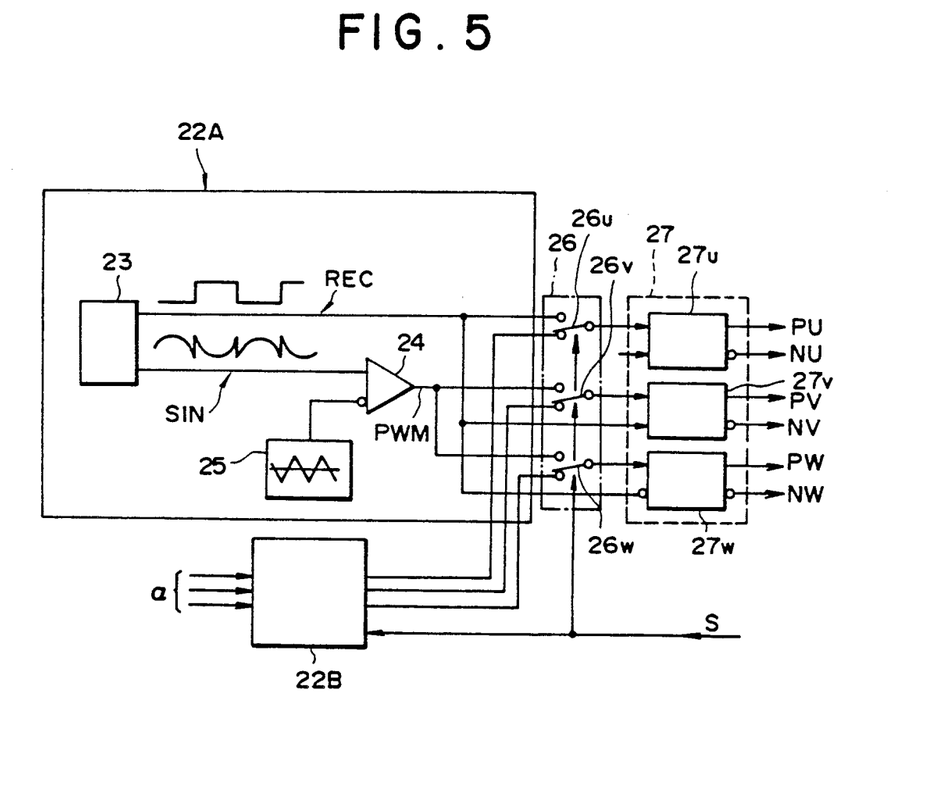
FIG. 5 is a block diagram showing a drive unit in the control circuit of FIG. 2.
Figure 6:
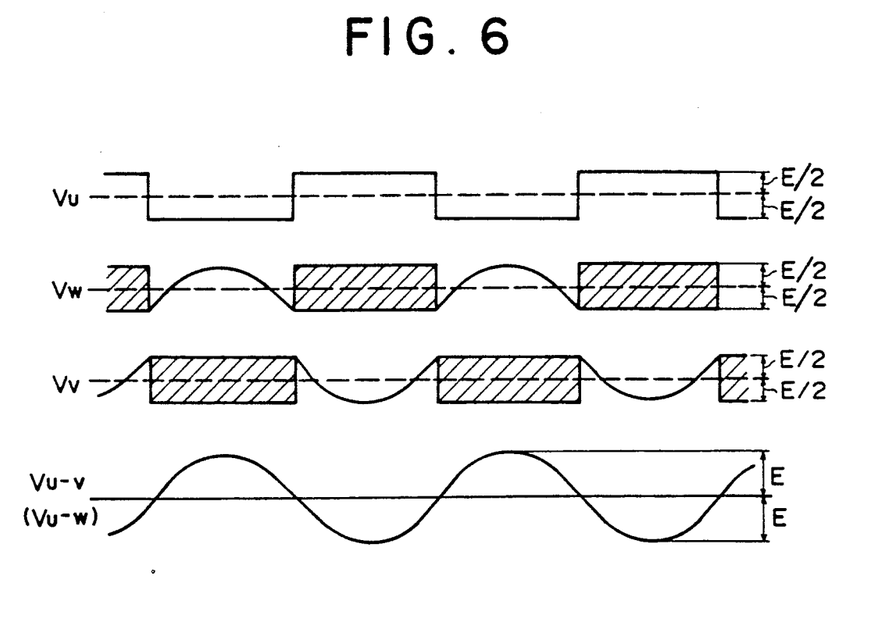
FIG. 6 is a voltage waveform appearing at the output terminals of an inverter circuit in the circuit diagram of FIG. 1.

The control circuit 19 comprises a control power supply 20 which receives power from the direct current switches 26u, 26v, and 26w of the signal switching unit 26 is switched to the side of the second drive unit 22A. A waveform as denoted at Vu−v (=Vu−w) is the one at the maximum output of the line-to-line voltage between the outputs u and v when v and w are short-circuited together. Designated at E is an input voltage of the main circuit of the inverter 13 and the hatched portion shows high impedance state.

With the arrangement of the engine driven generator, an operation of the engine driven generator will be described herewith.

First, the switching unit 12A and the contact Saw of the switch 12B are open while the contacts Sbu and Sbv of the switch 12B are closed so that output terminals u, v, and w of the main circuit of the inverter 13 are connected to the armature windings 3u, 3v, and 3w of the generator 3. The actuation switch 17 is turned on to supply the direct current power 15 to the main circuit of the inverter 13 while the main circuit of the inverter 13 is actuated by receiving a base signal $I_B$ supplied from the drivers 27u, 27v, and 27w on the basis of the signal produced by the first drive unit 22B. The main circuit of the inverter 13 converts the direct current power of the direct current power source 15 to the three-phase alternating current voltages U, V, and W having frequencies in synchronism with the speed of rotation N of the generator 3 and supplies it to the generator 3 whereby the generator 3 effects motor driving operation to actuate the engine 1. That is, the rotor position detector 10 and the main circuit of the inverter 13 correspond respectively to a brush and a commutator of a DC motor and the generator 3 effects the motor driving operation to actuate the engine 1 as a starter.

The speed of rotation N of the generator 3 is increased with the lapse of time after actuation of the engine 1 and reaches the predetermined speed $N_o$. At that time, the engine 1 completes the actuation thereof and the actuation completion detector 21 of the control circuit 19 issues the switching signal S so that the switch 12A and the contact Saw of the switch 12B are closed while the contacts Sbu and Sbv of the switch 12B are opened, whereby the output terminals u and v are connected to the terminals of the outer device (loads). At the same time the signal switching unit 26 is switched.

With the series of operations set forth above, the generator 3 starts to effect power generation operation. The voltage generated by the generator 3 is converted to direct current by the full-wave rectifier 11 and smoothed by the capacitor 14, and the smoothed direct current power is supplied to the main circuit of the inverter 13. The main circuit of the inverter 13 effects inverting operation on the reception of the base drive signal $I_B$, which is supplied by the U-phase driver 27u, V-phase driver 27v, and W-phase driver 27w on the basis of the signal produced by the second drive unit 22A, namely, by the H/L signal and the PWM signal. Since the U-phase driver 27u receives the H/L signal the transistors $T_{PU}$, $T_{NU}$ are turned on or off in synchronism with the H/L signal while the transistors $T_{PV}$, $T_{NV}$ effect PWM operation during the period of H-level of the H/L signal and rest at the other half cycle, and the transistors $T_{PW}$, $T_{NW}$ effect PWM operation during the period of L-level of the H/L signal and rest at the other half cycle. That is, the transistor pair $T_{PV}$ and $T_{NV}$, and the transistor pair $T_{PW}$ and $T_{NW}$ are alternately driven each half cycle of the basic wave with time sharing.

A transistor dissipation is classified generally to a normal dissipation L1 and an on-state and a transient dissipation (switching dissipation) L2 at the time of switching. During the PWM operation at several KHz the normal dissipation L1 and the transient dissipation L2 are in the ratio of 1:1. During the operation at a low frequency (at the time of operation of the U-phase transistors $T_{PU}$, $T_{NU}$) the normal dissipation L1 occupies substantially 100% of the whole dissipation.

Assuming that the normal dissipation L1 is 1, according to the present invention, the dissipation L of the V-phase transistors $T_{PV}$, $T_{NV}$ and the W-phase transistors $T_{PW}$, $T_{NW}$ will be:

L =(L1=1)+(L2=1)×operation hour 0.5 =1
which is same as the dissipation of the U-phase transistors $T_{PU}$, $T_{NU}$.

Assuming that no alternate time sharing operation is carried out, thereby resting the transistors $T_{PW}$, $T_{NW}$ completely while U-phase transistors $T_{PU}$, $T_{NU}$ are driven by the H/L signal and the V-phase transistors $T_{PV}$, $T_{NV}$ are successively subjected to the PWM operation, the dissipation of the V-phase transistors $T_{PV}$, $T_{NV}$ will be:

=(L1=1)+(L2=1)×operation hour 1 =2. This shows that the dissipation is two times that of the present embodiment. Provided that the capacity of the transistors is the same and assuming that dissipation is equal to ratio of load, then the relationship between the three-phases would be, U-phase : V-phase : W-phase =1:2:0. As a result, a sharing of each phase transistor is not balanced, while the relationship between the three-phases according to the present embodiment is balanced, namely, U-phase : V-phase : W-phase =1 : 1 : 1.

Hence, according to the present embodiment, assuming that the capacity of the main circuit of the inverter 13 is the same, compared with the case where the transistor corresponding to one-phase rests, for example, in the case where the W-phase transistors $T_{PW}$, $T_{NW}$, rest completely, it is possible to supply a single-phase alternating current having output of two times. On the other hand, assuming that the output value of the single-phase alternating current is the same, for example, compared with the case where the W-phase transistors $T_{PW}$, $T_{NW}$ rest completely, the capacity of the main circuit of the inverter 13 will be reduced to half which results in allowing the device to be small sized.

Figure 7:
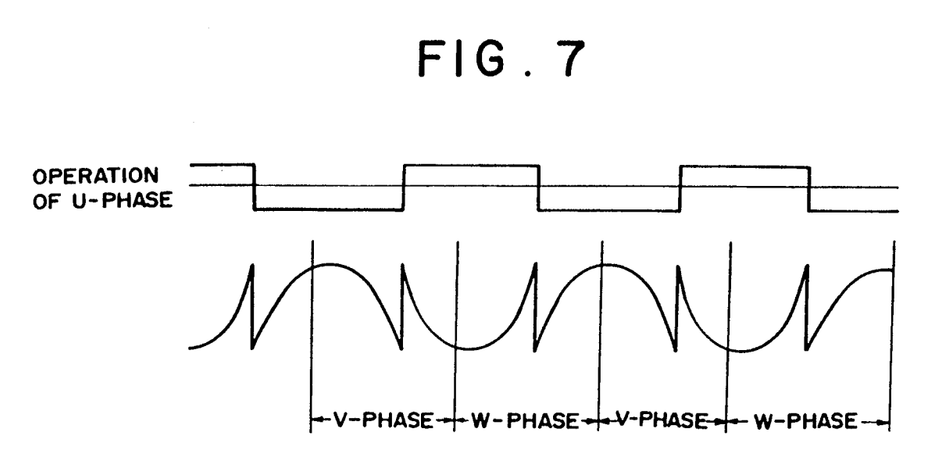
FIG. 7 is a time chart of operation of transistors associated with the three phases.

According to the present embodiment, although the ON/OFF timing of the U-phase transistors $T_{PU}$, $T_{NU}$ is synchronous with the operation switching timing of the transistors $T_{PV}$, $T_{NV}$ and the transistors $T_{PW}$, $T_{NW}$ the operations of V-phase transistors $T_{PV}$, $T_{NV}$ and the W-phase transistors $T_{PW}$, $T_{NW}$ may be shifted relative to the operations of U-phase transistors $T_{PU}$, $T_{NU}$, as shown in FIG. 7.

Furthermore, according to the present embodiment the operations of the V-phase transistors $T_{PV}$, $T_{NV}$, and the U-phase transistors $T_{PU}$, $T_{NU}$ are alternated with phase angle of 180° radian, but they may be alternated with phase angles of 45°, 90°, 120° radians which have the same effect as that of the phase angle of 180° radian. Hence, the V-phase transistors $T_{PV}$, $T_{NV}$ and the W-phase transistors $T_{PW}$, $T_{NW}$ may be alternately operated with substantially 50 percent time sharing.

The backflow prevention diode 16 is provided for preventing the current from flowing back since the voltage of the capacitor 14 is automatically greater than that of the direct current power supply 15 after the actuation of the engine 1.

Figure 8:
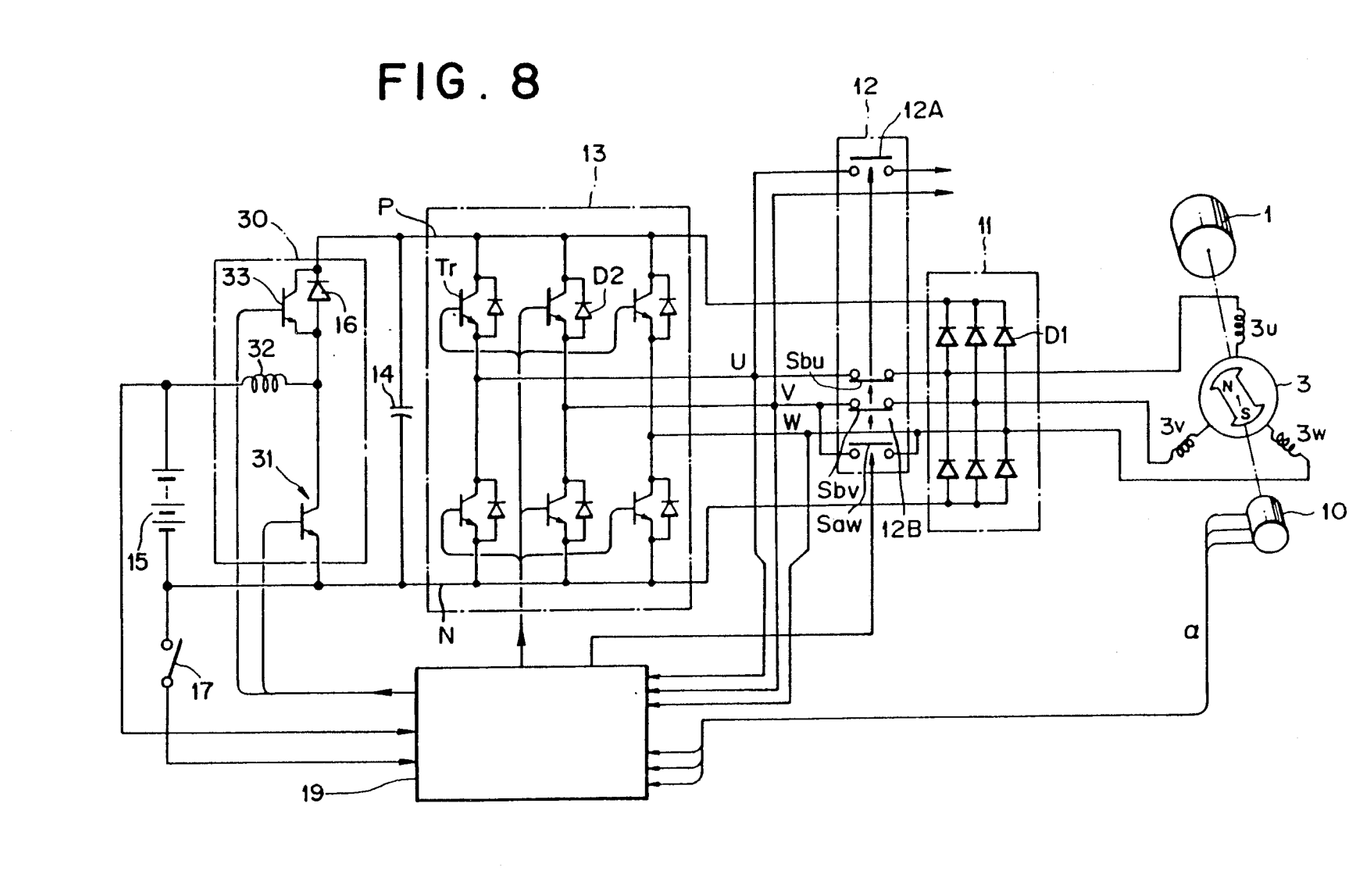
FIG. 8 is a circuit diagram of an engine driven generator according to a second embodiment of the present invention.
Figure 9:
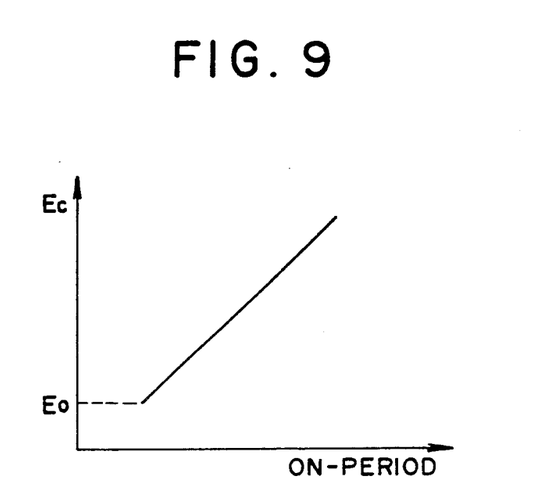
FIG. 9 is a view showing an operation characteristic of a chopper circuit according to the circuit diagram of FIG. 8.

Second Embodiment (FIGS. 8 and 9)

An engine driven generator according to the second embodiment of the present invention will be described with reference to FIGS. 8 and 9.

The engine driven generator comprises a chopper circuit 30 for increasing the voltage of the direct current power supply 15 to be supplied to the main circuit of the inverter 13, in addition to the same elements as the first embodiment. The chopper circuit 30 has a chopper 31, a reactor 32, and a chopper controller (not shown) provided at the control circuit 19 for controlling the ON/OFF period where the direct current obtained by rectification of the output voltage of the main circuit of the inverter 13 is supplied to the chopper 31 as a feedback signal. The chopper circuit 30 has an operation characteristic as illustrated in FIG. 9. In FIG. 9 designated at Eo is the voltage of the direct current power supply 15, Ec is the voltage of the capacitor 14.

Figure 10:
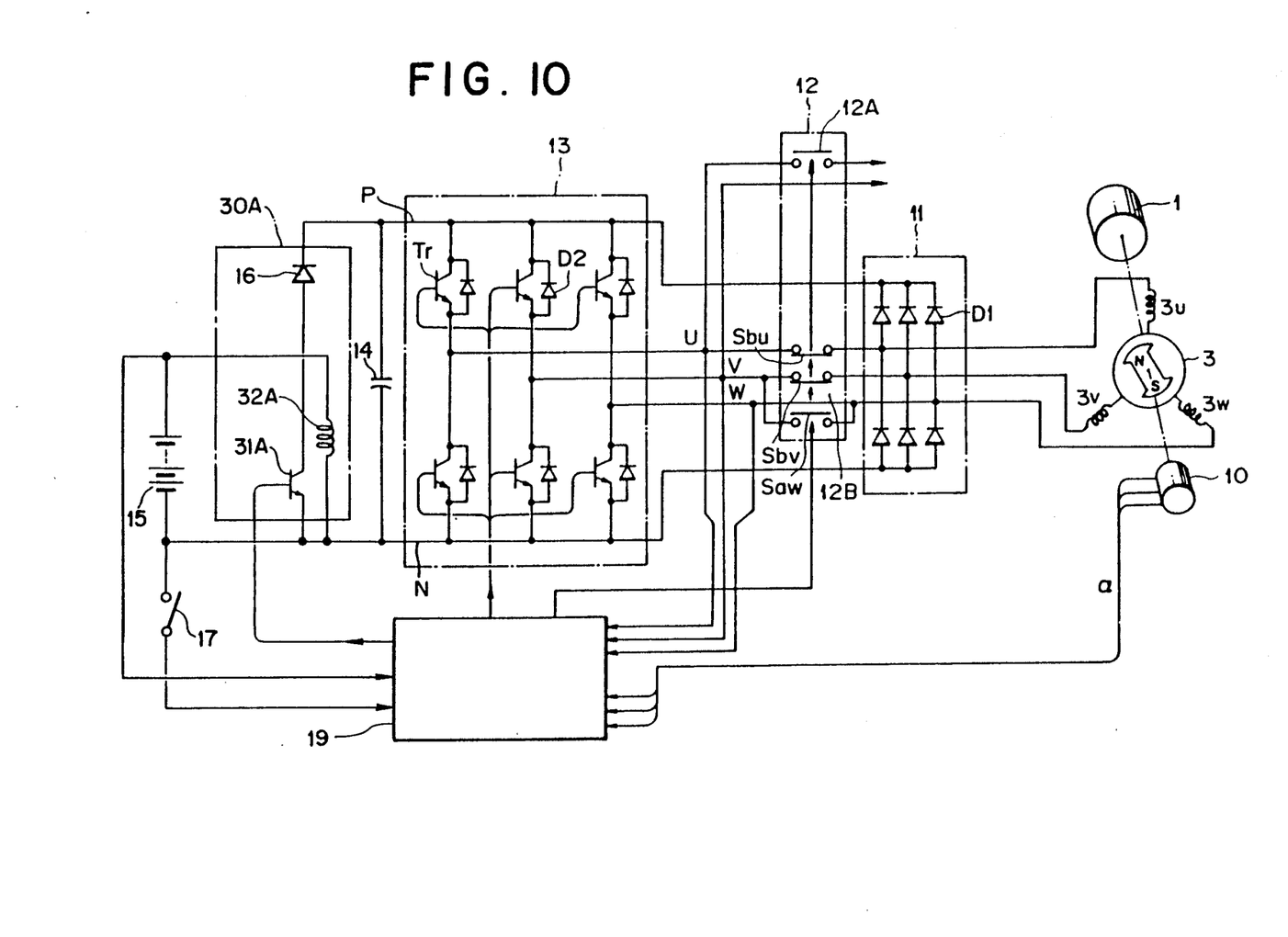
FIG. 10 is a circuit diagram of an engine driven generator according to a third embodiment of the present invention.
Figure 11:
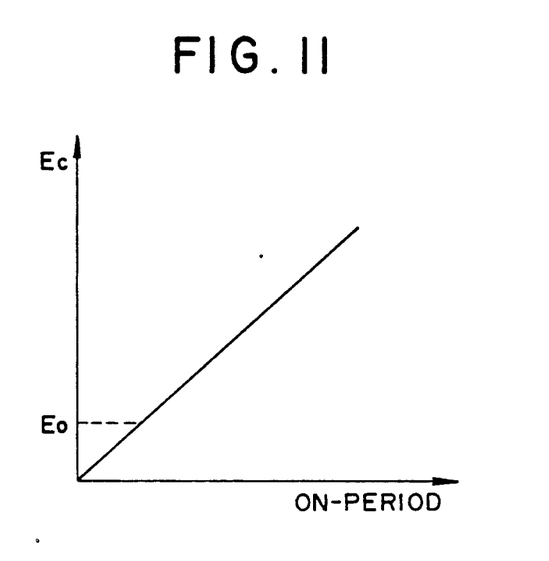
FIG. 11 is a view showing an operation characteristic of a chopper circuit according to the circuit diagram of FIG. 10.

Third Embodiment (FIGS. 10 and 11)

An engine driven generator according to the third embodiment of the present invention will be described with reference to FIGS. 10 and 11.

In the chopper circuit 30 for increasing the voltage inasmuch as the input voltage of the main circuit of the inverter 13 cannot be decreased under the voltage value of the direct current power supply 15 as illustrated in FIG. 9, the speed of rotation of the generator 3 is small when the generator 3 is just actuated so that an excessive current will flow through the main circuit of the inverter 13 when the speed induction voltage is low. To prevent the flowing of the excessive current, the chopper circuit 30A for increasing the voltage may be provided as illustrated in FIG. 10. The chopper circuit 30A comprises a chopper 31A (a transistor in this embodiment), a reactor 32A, and a chopper controller (not shown) provided at the control circuit 19 for controlling the ON/OFF period where the direct current obtained by rectification of the output voltage of the main circuit of the inverter 13 is supplied to the chopper 31A as a feedback signal. The chopper circuit 30A decreases the voltage provided that the ON period of the transistor 31A is shortened, while the chopper circuit 30A increases the voltage provided that the ON period of the transistor 31A is prolonged. An operation characteristic of the chopper circuit 30A for increasing and decreasing the voltage is illustrated in FIG. 11, designated at Eo is the voltage of the direct current power supply 15, Ec is the voltage of the capacitor 14.

Figure 12:
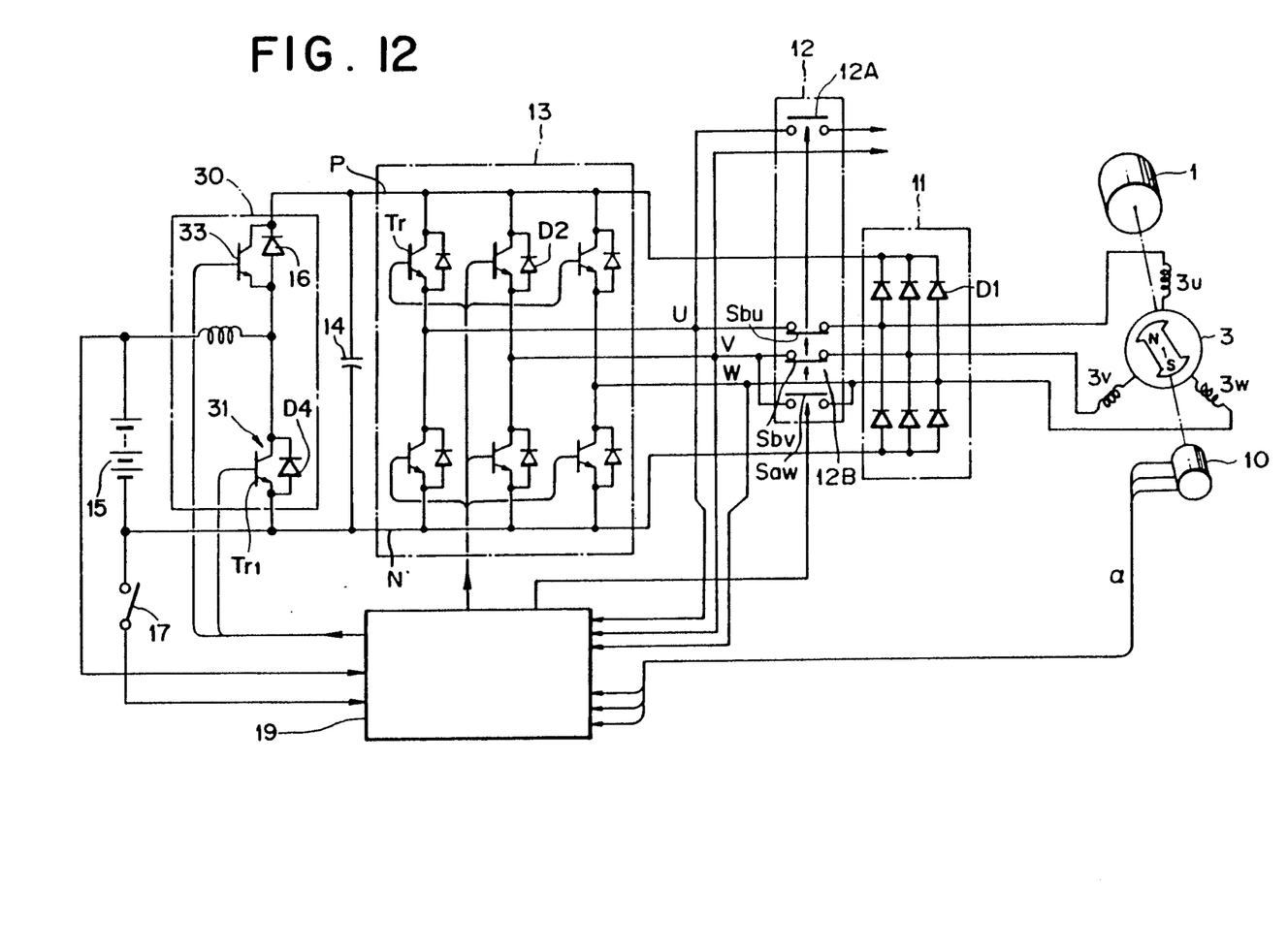
FIG. 12 is a circuit diagram of an engine driven generator according to a fourth embodiment of the present invention.

Fourth Embodiment (FIG. 12)

An engine driven generator according to a fourth embodiment of the present invention will be described to with reference to FIG. 12.

The engine driven generator of the fourth embodiment is different from that of the third embodiment as illustrated in FIG. 10 in that the element 33 for charging the battery (a transistor in this embodiment) is provided. A charging controller is provided at the control circuit 19 (not shown) for controlling the transistor 33 to thereby supply an ON signal from the charging controller at the time when the switching signal S is issued. There is provided a backflow prevention diode D4. The charging means or elements can be employed in the engine driven generator of the third embodiment. Each embodiment has the signal switching unit 26 having contacts but could have gate logic switches actually mounted instead of contacts.

The control circuit 19 is illustrated as analog structure but may be digital structure. The operation of the main circuit of the inverter 13 can be executed by a software. The control system in each embodiment can be adapted to an engine driven generator having a main circuit other than the main circuit of the inverter 13.

Figure 14:
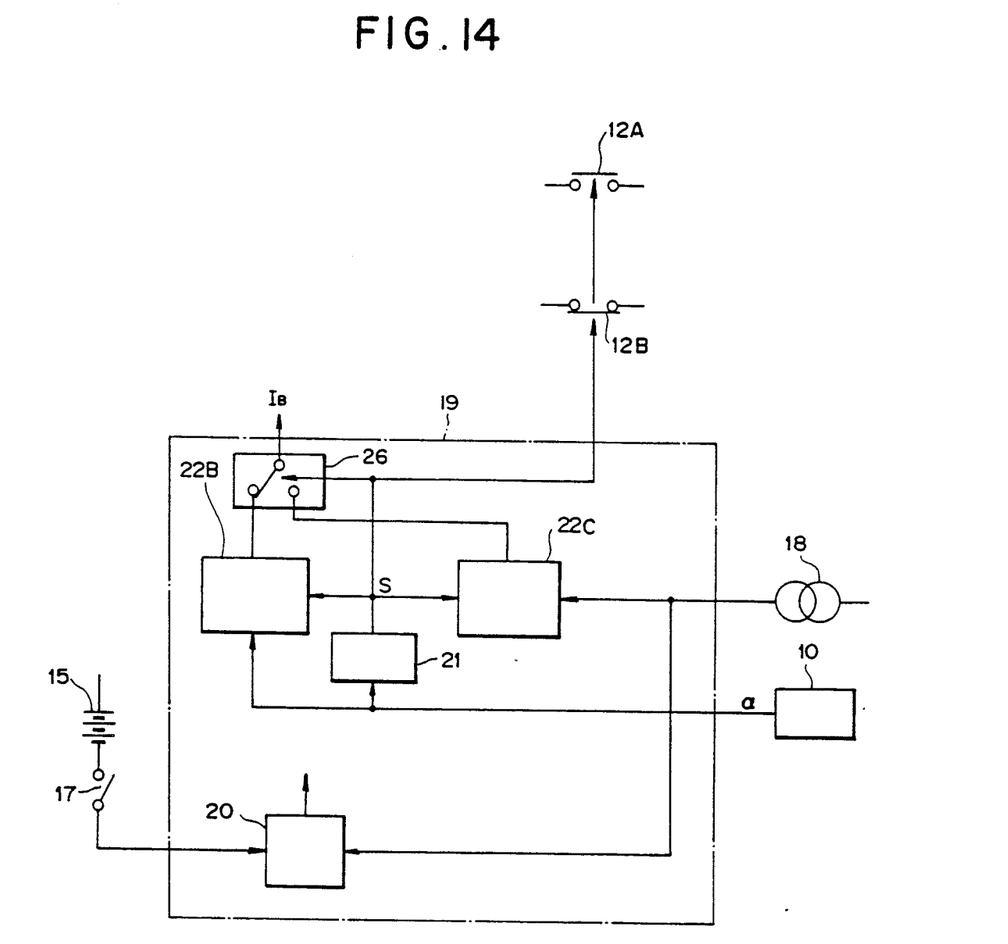
FIG. 14 is a block diagram showing a control circuit in the circuit diagram of FIG. 12.
Figure 15:
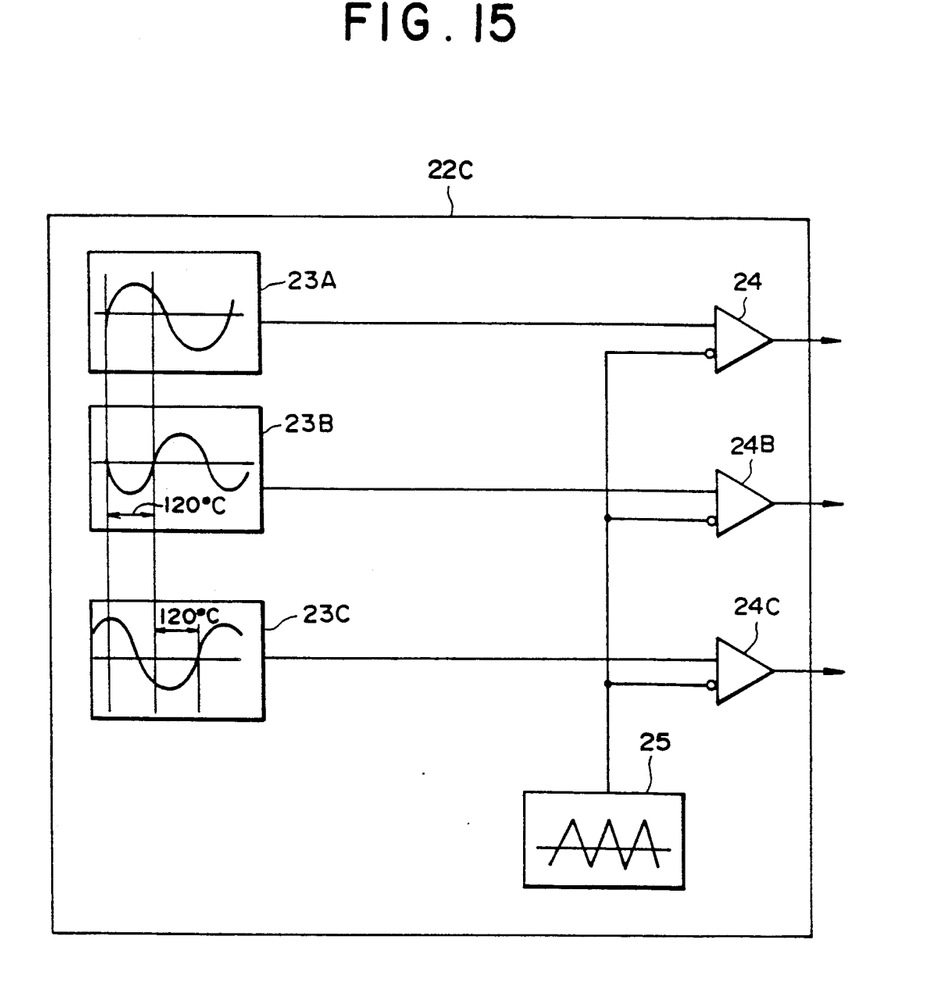
FIG. 15 is a block diagram showing a drive unit in the control circuit of FIG. 13.

Fifth Embodiment (FIGS. 13 to 15)

The generator 3 employed in the first embodiment is the three-phase synchronous generator and the main circuit of the inverter 13 is the three-phase inverter. However, the engine driven generator according to the fifth embodiment of the present invention can be used as the three-phase generator by changing the control system.

When using as the three-phase generator, the switching unit 12 of the first embodiment may be replaced by the three-phase switching unit as illustrated in FIG. 13 while the second drive unit 22A of the first embodiment may be replaced by a second drive unit 22C for producing a PWM signal for supplying to a U-phase driver 27u, V-phase driver 27v, and W-phase driver 27w respectively of a driver unit 27. The contact 12A of the switching unit 12 has three normally open contacts Sau, Sav, and Saw while the contact 12B has three normally closed contacts Sbu, Sbv, and Sbw. Designated at 23A, 23B and 23C are respective signal generators shifted for 120° in phase angle. Also, 24A, 24B and 24C are respective comparators and 25 is a triangular wave generator. Designated at 18 is a transformer for feeding back the output voltages U, V, and W from the output terminals u, v, and w to the control circuit 19.

With the arrangement of the engine driven generator according to the fifth embodiment of the present invention, the rotor position detector 10 and the main circuit of the inverter 13 operate corresponding to the brush and the armature of a direct current motor while three-phase synchronous generator 3 carries out the motor driving operation to actuate the engine 1. After completion of the actuation of the engine 1, the synchronous generator 3 carries out a generating operation and the alternating current output is converted by the main circuit of the inverter 13 to a stable three-phase alternating current power having a predetermined voltage with a predetermined frequency.

As is evident from the explanation, the engine driven generator according to the first to the fourth embodiments, a mere change of the switching unit 12 as well as a change of the second drive unit of the control circuit 19 (such as by substitution of a printed circuit) thereby changes the control system and enables it to be employed as a three-phase generator as well as a single-phase generator. Additionally, inasmuch as the bridge circuit composed of transistors of the same capacity constituting the main circuit of the inverter 13 is general, and moduled and available with module and low cost, the engine driven generator can be mass-produced. Furthermore, because the constituents excluding the engine and the synchronous generator are very simple, the engine driven generator can be realized with low cost, light weight, and compact size.

The direct current power supply, namely, the direct current power supply having the chopper circuit 30 for increasing the voltage, the direct current power supply 30A for increasing and decreasing the voltage, and the direct current power supply having the battery charging element 33 respectively illustrated in FIGS. 8, 10, 12 can be employed in the engine driven generator of the fifth embodiment.

As explained in detail above, it is possible to provide an engine driven generator having no exclusive starter with simple construction so that the engine driven generator becomes small sized and compact, with easy maintenance thereof. In the case where singlephase alternating current is produced, one phase of the switching element of the main circuit of the inverter for converting the output of the generator into a predetermined voltage with a predetermined frequency is subjected to successively low frequency switching operation while the other two phase switching elements are subjected to a high frequency switching operation alternately each half cycle, whereby the main circuit can be operated with an optimum conversion efficiency at the motor driving operation of both the single-phase generator and the three-phase generator to thereby increase remarkably the single-phase alternating current capacity and to reduce the cost thereof.

Although the invention has been described in its preferred form with a certain degree of particularity, it is to be understood that many variations and changes are possible in the invention without departing from the scope thereof.

What is claimed is:

1. In an engine driven generator unit comprising:
   an engine;
   a three-phase synchronous generator, and means for permitting said synchronous generator to be driven by the engine to generate electric power;
   a direct current power supply for providing direct current power for use in actuating the engine;
   inverter means for converting the direct current provided by the direct current power supply into an alternating current and supplying the alternating current to the three-phase synchronous generator so that the three-phase synchronous generator performs a motor driving operation to actuate the engine, the inverter means having a pair of input terminals and a plurality of switching elements connected with each other in pairs which shunt said input terminals;
   the improvement comprising control means operative while the three-phase synchronous generator effects power generation for alternatingly and oppositely switching each of a first said pair of switching elements respectively ON and OFF while simultaneously applying PWM control signals of equal time duration in alternating succession to second and third said pairs of switching elements, said inverter means having a plurality of output terminals, said second pair of switching elements being connected to each other at one of said output terminals, said third pair of switching elements being connected to each other at one of said output terminals, and means operable simultaneously with said control means for connecting the output terminals corresponding to the second and third pairs of switching elements to each other.

2. An engine driven generator unit according to claim 1, wherein said control means includes means for applying square wave to said first pair of switching elements, and wherein said PWM control signals are opposite half waves of a sine wave.

3. An engine driven generator unit according to claim 1, wherein said direct current power supply is a battery connected between the input terminals of the inverter means via a further switching element, said control means including means for ensuring that the further switching element is not turned on during said actuation of the engine.

4. An engine driven generator according to claim 1, wherein the direct current power supply comprises a battery which provides a predetermined voltage, and chopper means connected between said battery and said inverter means for converting the predetermined voltage of the battery into an increased voltage at said inverter means.

5. An engine driven generator according to claim 1, wherein the direct current power supply comprises a battery which provides a predetermined voltage, and chopper means connected between said battery and said inverter means for converting the predetermined voltage of the battery into respective increased and decreased voltages at said inverter means.

6. An engine driven generator unit having no exclusive starter, comprising:
   an engine having an output shaft;
   a synchronous generator coupled to said output shaft of said engine, said synchronous generator having an output and current generating means cooperable with said engine for producing alternating current at said generator output, said current generating means including a rotor;
   a rotor position detector connected to said synchronous generator for detecting the rotational position of said rotor;
   a full-wave rectifier connected to said generator output for rectifying said alternating current;

inverter means for converting input direct current power into output alternating current power, said inverter means including an output at which said output alternating current power is provided, and a plurality of switching elements;

a direct current power supply connected to said inverter means for supplying power to actuate said engine, and having a semiconductor device for preventing current from flowing back into said direct current power supply from said inverter means;

a switching unit including first switch means for connecting said output of said inverter means to a load, and second switch means for connecting said output of said inverter means to said output of said synchronous generator to thereby actuate said engine via said output shaft;

control circuit means connectable to the direct current power supply for operating said first and second switch means and controlling said switching elements of said inverter means; and said direct current power supply including a battery which provides a predetermined voltage, and chopper means connected between said battery and said inverter means for converting said predetermined voltage of said battery into an increased voltage at said inverter means.

7. An engine driven generator unit according to claim 6, wherein said inverter means includes direct current terminals for receiving said input direct current power, wherein said direct current power supply is interposed between said direct current terminals of said inverter means, and wherein said chopper means includes a charging means connected between said battery and one of said direct current terminals for permitting charging of said battery, said control circuit means including means for actuating said charging means only after said engine has been actuated and for preventing actuation of said charging means during said actuation of said engine.

8. An engine driven generator unit having no exclusive starter, comprising:

an engine having an output shaft;

a synchronous generator coupled to said output shaft of said engine, said synchronous generator having an output and current generating means cooperable with said engine for producing alternating current at said generator output, said current generating means including a rotor;

a rotor position detector connected to said synchronous generator for detecting the rotational position of said rotor;

a full-wave rectifier connected to said generator output for rectifying said alternating current;

inverter means for converting input direct current power into output alternating current power, said inverter means including an output at which said output alternating current power is provided, and a plurality of switching elements;

a direct current power supply connected to said inverter means for supplying power to actuate said engine, and having a semiconductor device for preventing current from flowing back into said direct current power supply from said inverter means;

a switching unit including first switch means for connecting said output of said inverter means to a load, and second switch means for connecting said output of said inverter means to said output of said synchronous generator to thereby actuate said engine via said output shaft;

control circuit means connectable to the direct current power supply for operating said first and second switch means and controlling said switching elements of said inverter means; and said direct current power supply means including a battery which provides a predetermined voltage, and chopper means connected between said battery and said inverter means for converting said predetermined voltage of said battery into respective increased and decreased voltages at said inverter means.

9. An engine driven generator unit according to claim 8, wherein said inverter means includes direct current terminals for receiving said input direct current power, wherein said direct current power supply is interposed between said direct current terminals of said inverter means, and wherein said chopper means includes a charging means connected between said battery and one of said direct current terminals for permitting charging of said battery, said control circuit means including means for actuating said charging means only after said engine has been actuated and for preventing actuation of said charging means during said actuation of said engine.

* * * * *